United States Patent
Smith et al.

(10) Patent No.: US 9,953,475 B2
(45) Date of Patent: Apr. 24, 2018

(54) 4D BARCODE

(71) Applicant: Cubic Corporation, San Diego, CA (US)

(72) Inventors: Gavin Smith, Crawley (GB); Steffen Reymann, Reigate (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 15/498,899

(22) Filed: Apr. 27, 2017

(65) Prior Publication Data

US 2017/0316626 A1    Nov. 2, 2017

Related U.S. Application Data

(60) Provisional application No. 62/328,314, filed on Apr. 27, 2016.

(51) Int. Cl.
*G06K 5/00* (2006.01)
*G07C 9/00* (2006.01)
(Continued)

(52) U.S. Cl.
CPC ... *G07C 9/00087* (2013.01); *G06K 19/06037* (2013.01); *G06K 19/06112* (2013.01); *G07C 2009/00095* (2013.01); *H04W 88/02* (2013.01)

(58) Field of Classification Search
CPC ......... G06K 9/06037; G06K 19/06112; G07C 9/00087; G07C 9/00015;
(Continued)

(56) References Cited

U.S. PATENT DOCUMENTS 8,231,054 B1   7/2012 Kim
9,396,376 B1 *  7/2016 Narayanaswami ........................
                        G06K 19/06056
(Continued)

FOREIGN PATENT DOCUMENTS

GB          2467113 A      7/2010

OTHER PUBLICATIONS

International Search Report and Written Opinion dated Jun. 29, 2017 for International Patent Application No. PCT/US2017/029793; all pages.

*Primary Examiner* — Claude J Brown
(74) *Attorney, Agent, or Firm* — Kilpatrick Townsend and Stockton, LLP

(57) ABSTRACT

A mobile device including a communications interface, a memory, a display screen, and a processing unit. The processing unit is configured to retrieve a first key of an asymmetric key pair. A second key of the asymmetric key pair is stored on an access control device. The processing unit is configured to generate a plurality of barcodes. Each of the barcodes includes data that is encrypted using the first key and the current date and time. At least some of the barcodes are distinct from one another. At least one of the barcodes includes access information. The processing unit is configured to sequentially display the barcodes such that only a single one of the barcodes is displayed on the display screen of the mobile device at a single time. The barcodes are read and decrypted by the access control device using the second key and the current date and time.

20 Claims, 4 Drawing Sheets

(51) Int. Cl.
  *G06K 19/06*  (2006.01)
  *H04W 88/02*  (2009.01)

(58) Field of Classification Search
  CPC ...... G07C 2009/00841; H04L 63/0846; H04L 63/068; H04L 2463/061; H04L 9/30; G06F 21/30
  USPC ........................................................ 235/382
  See application file for complete search history.

(56) References Cited

U.S. PATENT DOCUMENTS

| | | | | |
|---|---|---|---|---|
| 9,510,201 | B1* | 11/2016 | Shimoon | H04W 76/023 |
| 9,640,001 | B1* | 5/2017 | Vazquez | G07C 9/00007 |
| 9,672,458 | B2* | 6/2017 | Burkhart | G06K 19/06037 |
| 2011/0000958 | A1* | 1/2011 | Herzig | G06K 7/1093 |
| | | | | 235/375 |
| 2012/0023167 | A1* | 1/2012 | Hovdal | G06K 7/1095 |
| | | | | 709/204 |
| 2012/0068818 | A1* | 3/2012 | Mizon | G07C 9/00007 |
| | | | | 340/5.61 |
| 2012/0138693 | A1* | 6/2012 | Litz | G06K 7/1095 |
| | | | | 235/494 |
| 2012/0144204 | A1* | 6/2012 | Litz | G07C 9/00158 |
| | | | | 713/186 |
| 2012/0284517 | A1* | 11/2012 | Lambert | H04L 63/0823 |
| | | | | 713/169 |
| 2013/0020393 | A1* | 1/2013 | Hwang | G06K 19/06112 |
| | | | | 235/462.11 |
| 2013/0110717 | A1* | 5/2013 | Kobres | G06Q 20/3276 |
| | | | | 705/43 |
| 2013/0124292 | A1* | 5/2013 | Juthani | G06F 21/41 |
| | | | | 705/14.26 |
| 2013/0321126 | A1* | 12/2013 | Akita | G07C 9/00007 |
| | | | | 340/5.61 |
| 2014/0117074 | A1* | 5/2014 | Kim | G06K 7/1095 |
| | | | | 235/375 |
| 2014/0117100 | A1* | 5/2014 | Black | G07F 19/20 |
| | | | | 235/494 |
| 2014/0144980 | A1* | 5/2014 | Liu | G06F 17/00 |
| | | | | 235/375 |
| 2014/0359578 | A1* | 12/2014 | Jesse | G06F 8/61 |
| | | | | 717/124 |
| 2015/0186665 | A1 | 7/2015 | Herring et al. | |
| 2015/0269559 | A1 | 9/2015 | Inotay et al. | |
| 2015/0356563 | A1* | 12/2015 | Vohra | G06Q 20/40145 |
| | | | | 705/44 |
| 2016/0182495 | A1* | 6/2016 | Stuntebeck | H04L 63/0846 |
| | | | | 713/156 |
| 2016/0248782 | A1* | 8/2016 | Troesch | G07C 9/00007 |

\* cited by examiner

4D BARCODE

CROSS-REFERENCES TO RELATED APPLICATIONS

This Application claims priority to U.S. Provisional Patent Application No. 62/328,314 filed Apr. 27, 2016, entitled "4D BARCODE," the entire disclosure of which is hereby incorporated by reference, for all purposes, as if fully set forth herein.

BACKGROUND OF THE INVENTION

It is currently very easy to duplicate barcode tickets, such as QR Code style transit tickets, simply by photographing or otherwise producing an image of an original barcode. Due to the ease in duplication, potential fraudulent use of such tickets is highly likely. Standards exist to prevent a ticket from being used twice, but don't ensure that the rightful owner is the one who uses it. For example, admission or access systems may keep track of all barcodes used to gain entry to an access-controlled area, thus ensuring that a second attempt to gain entry with a previously used barcode will result in a determination that the barcode is invalid for the second use. However, there are no precautions in place that ensure that the first user of the barcode was in fact the rightful owner. If a fraudulent user manages to copy the rightful owner's barcode and presents the copied barcode image prior to the rightful owner attempting to gain entry with the barcode, the fraudulent user will be permitted access while the rightful owner will be turned away, as there is no present way to readily determine that the possessor of a barcode ticket is the rightful owner. Improvements in this area are desired.

BRIEF SUMMARY OF THE INVENTION

The present invention is generally directed toward using a mobile phone application to generate multiple quick response (QR) code-style or other barcode tickets. These barcodes may be displayed in a sequence, such as in a short, looping video that may be read by conventional barcode readers. To ensure that the barcodes are used only a single time for entry to an access-controlled area, the barcodes may be generated by and/or delivered to the mobile device just prior to entrance into the access-controlled area. Each of the barcodes may be encrypted and/or otherwise encoded to include a current time and/or date. When presented by the user of the mobile device to an access control device, the access control device may decrypt the data from the barcode using its own knowledge of the current time and date. This ensures that there is only small window of time in which a fraudulent user would be able to acquire and use the misappropriated barcode. To further minimize the opportunity for fraudulent use of the barcodes, prior to generating and/or otherwise acquiring the barcodes, the user's mobile application and/or mobile device may detect that the mobile device is near an access control device of an access-controlled area. For example, in order to trigger the generation of the barcodes, the phone must detect a wireless signal emitted from a beacon proximate the access point and/or optically detect the access control device using a camera or other imaging device of the mobile device. This ensures that the rightful user of the ticket is nearby and about to enter the access-controlled area prior to generating the barcodes, thus minimizing the time that a fraudulent user has to copy and present a misappropriated barcode. Although embodiments describe the use of a "mobile phone," other mobile devices such as tablets, media players, personal digital assistants (PDAs), and the like may be used.

In one aspect, a mobile device is provided. The mobile device may include a communications interface, a memory, a display screen, and a processing unit. The processing unit may be configured to retrieve a first key of an asymmetric key pair. A second key of the asymmetric key pair may be stored on an access control device. The processing unit may also be configured to generate a plurality of barcodes. Each of the plurality of barcodes may include data that is encrypted using the first key and a current date and time. At least some of the plurality of barcodes may be distinct from one another. At least one of the plurality of barcodes may include access information. The processing unit may be further configured to sequentially display the plurality of barcodes such that only a single one of the plurality of barcodes may be displayed on the display screen of the mobile device at a single time. The plurality of barcodes may be read and decrypted by the access control device using the second key and the current date and time.

In another aspect, a method for managing access to a controlled area using a mobile device is provided. The method may include retrieving, by a mobile device, a first key of an asymmetric key pair. A second key of the asymmetric key pair may be stored on an access control device. The method may also include generating, by the mobile device, a plurality of barcodes. Each of the plurality of barcodes may include data that is encrypted using the first key and a current date and time. At least some of the plurality of barcodes may be distinct from one another. At least one of the plurality of barcodes may include access information. The method may further include sequentially displaying the plurality of barcodes such that only a single one of the plurality of barcodes may be displayed on a screen of the mobile device at a single time. The plurality of barcodes may be read and decrypted by the access control device using the second key and the current date and time.

In another aspect, a non-transitory computer-readable medium having instructions embedded thereon for managing access to a controlled area using a mobile device is provided. The instructions may include computer code for causing a computing device to retrieve a first key of an asymmetric key pair. A second key of the asymmetric key pair may be stored on an access control device. The instructions may also include computer code for causing the computing device to generate a plurality of barcodes. Each of the plurality of barcodes may include data that is encrypted using the first key and a current date and time. At least some of the plurality of barcodes may be distinct from one another. At least one of the plurality of barcodes may include access information. The instructions may further include computer code for causing the computing device to sequentially display the plurality of barcodes such that only a single one of the plurality of barcodes may be displayed on a display screen of the mobile device at a single time. The plurality of barcodes may be read and decrypted by the access control device using the second key and the current date and time.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

According to embodiments of the current invention, a mobile phone (via its camera) recognizes a barcode reader (e.g., of a certain manufacture or type (e.g., a barcode reader in a transit system)), a mobile application on the mobile phone can cause the mobile phone to play a handful of different barcode images as frames in a short looping video. This stops people from simply copying the QR code and using it as a ticket. Each frame of the video contains data encrypted using the combination of at least one trusted key and the phone's current date and time. The validator that reads the video decrypts each of the frames in the video using its own key and its own knowledge of the current time. This stops other people from copying the video (if they can even get it playing) and using it at a different time.

Embodiments of the present invention can use a smartphone's camera to detect a transit barcode reader before generating the secure barcodes. The ticket can be played as a video of multiple encrypted image—only when the application detects that the video is being watched by a certain type of validator. The ticket's barcode images can be encrypted using the current time as well as a shared key. The validator that reads the video can decrypt each of the frames in the video using its own key and its own knowledge of the current time. This can stop people from stealing barcode tickets by copying the image, and even if they could copy the video of the multiple barcodes playing it would be useless unless used at exactly the same time.

Figures 1A, 1B:
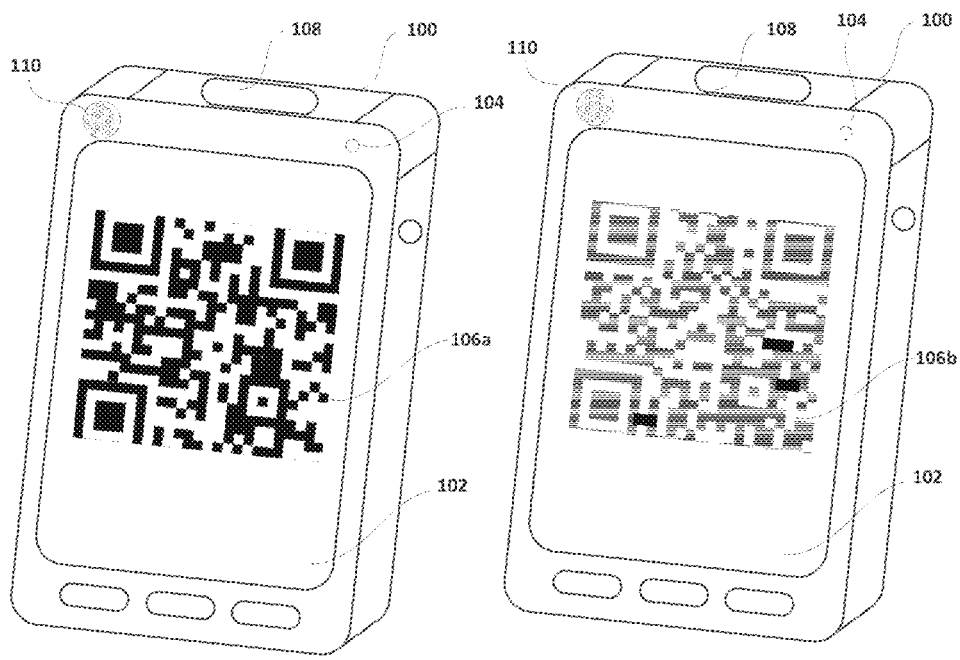
FIG. 1A depicts a mobile device displaying a first of a series of QR codes according to embodiments.
FIG. 1B depicts the mobile device of FIG. 1A displaying a second of the series of QR codes according to embodiments.

Turning now to FIGS. 1A-1D, a mobile device 100 is shown. Mobile device 100 may be a mobile phone, tablet computer, PDA, e-reader, and/or other mobile device having a display that may present computer readable identifiers. Typically, mobile device 100 will include at least one communications interface, such as a WiFi interface, Bluetooth Low Energy, NFC, 3G, 4G, LTE, and/or other interface configured to operate with a wireless communication protocol, a memory, and a processing unit. Mobile device 100 may also include a display screen 102 as shown in FIG. 1A. In some embodiments, mobile device 100 may include at least one optical imaging device, such as a camera 104. There may be one or more cameras 104 positioned on a front and/or back of mobile device 100. Mobile device may also include one or more readers, such as an NFC and/or RFID reader 108.

Figures 1C, 1D:
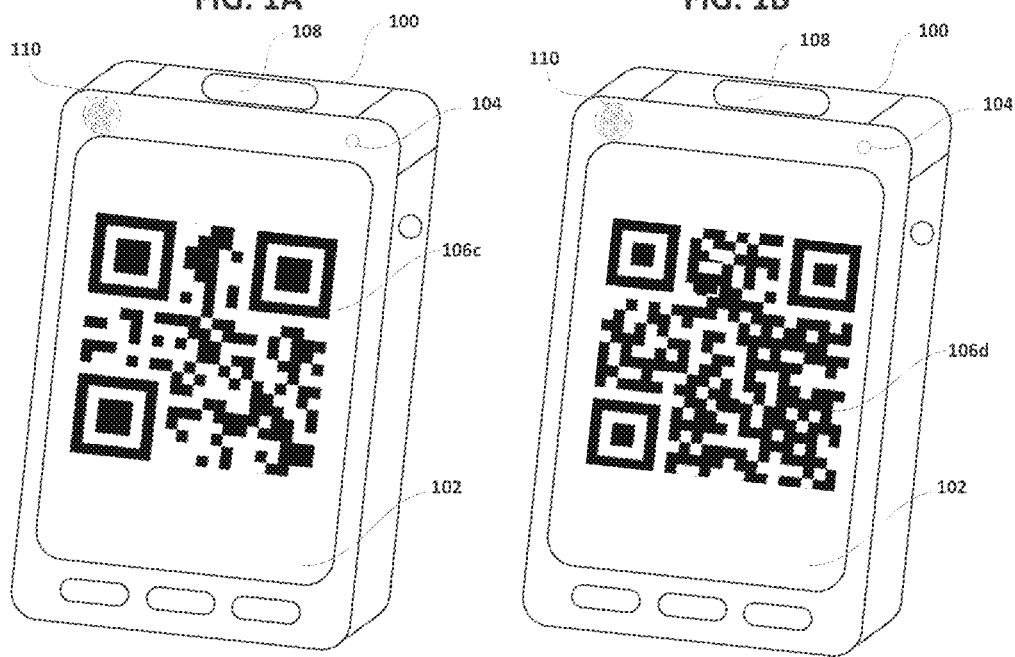
FIG. 1C depicts the mobile device of FIG. 1A displaying a third of the series of QR codes according to embodiments.
FIG. 1D depicts the mobile device of FIG. 1A displaying a last of the series of QR codes according to embodiments.

Oftentimes, mobile device 100 may be presented as an access media to gain access to a controlled area, such as a transit system, a sporting event, a concert, controlled area in a building, and/or other access controlled locations. In order to provide access, the mobile device 100 may be configured to generate and/or display a computer readable identifier, such as a quick response (QR) code. For example, the mobile device 100 may download a mobile application, such as one provided by an operator of an access-controlled area. The mobile application may be configured to interact with access control equipment and enable the mobile device 100 to generate and display the necessary QR codes. While described primarily in regards to QR codes, it will be appreciated that other identifiers, such as standard barcodes, images, and/or other unique symbols may also be used. In order to ensure that a QR code is not easily copied and misappropriated by a fraudulent user, multiple QR codes 106a-106d may be generated and displayed. Typically, a series of QR codes may be displayed sequentially, within a predetermined period of time. As just one example, a short looping video of a number of QR codes may be displayed on the screen 102 of the mobile device 100. For example, mobile device 100 may first display QR code 106a as shown in FIG. 1A for a short period of time. After a predetermined period of time, QR code 106a may be replaced by QR code 106b, as shown in FIG. 1B. Similarly, QR code 106b may be replaced by QR code 106c after a predetermined time as shown in FIG. 1C. This process may continue until a final QR code is displayed. In some embodiments, each QR code 106a-106d may be displayed for the same amount of time, while in other embodiments, some of the QR codes 106a-106d may be displayed for different amounts of time. In the present example, QR code 106d shown in FIG. 1D is the final QR code in the set. However, it will be appreciated that a set of QR codes may include any number of at least two QR codes. Oftentimes, once the final QR code is displayed, the set of QR codes may be displayed again. In some embodiments, the subsequent loops of QR codes may be displayed in any order. For example, in subsequent loops, the QR codes may be displayed in a same order as was displayed the initial loop, or the set of QR codes may be displayed in a different order.

By presenting only a single QR code or other identifier on the screen 102 at a time, existing reader hardware at access control points may be used with the present invention. Thus, no hardware changes are necessary. Instead, existing systems may operate as designed, with the possible exception that new software is needed.

Each QR code 106a-106d may include the same or different data. In some embodiments, only one (or a small subset of QR codes) of the QR codes in the set may be encoded to contain access data. Access data may include information related to an access media, such as a unique identifier of a user and/or of the mobile device 100, ticket information, such as a ticket identifier, a seat location, a time and/or date of an event, a security code, and/or other information needed to access a particular access controlled area. Each operator of a controlled access area may determine what information is needed for access, and this information may be encoded on one or more of the QR codes 106a-106d.

To further decrease the likelihood that the barcodes may be copied and used by an unauthorized user, the barcodes within the set may have a short lifespan. For example, the set of QR codes may loop on the display screen of mobile device 100 for a short period of time, such as 30 seconds, one minute, and/or other predetermined time once generated. Once the timeframe expires, the original QR codes are invalidated and a new set of QR codes must be generated. The generation of new QR codes may be triggered automatically, such that as the original QR codes expire, the set of QR codes refreshes and starts looping a different, newly generated set of QR codes. In other embodiments, once the original QR codes expire, a mobile application running on the mobile device 100 may alert the user and prompt the user for a confirmation to generate a new set of QR codes. For example, the mobile application may display a request for a user confirmation input and/or generate a voice request using a speaker 110 of the mobile device 100. The mobile device 100 may receive the confirmation input, such as by receiving a touch input on the display screen 102, a biometric input from a biometric sensor (such as fingerprint sensor, retinal scanner/camera, voice sample, input, and the like), and/or any other input. Once confirmation is received, mobile device 100 may generate and display a new set of QR codes.

Oftentimes, the QR codes may be encrypted. Typically, this involves encrypting the QR codes using one or more keys that are retrieved by the mobile device 100. For example, the QR codes may be encrypted using one key of an asymmetric key pair that is assigned by an operator of the access controlled area. For example, in a transit setting, a transit server or back office may generate a key pair and provide one of the keys to the mobile device 100 and provide the other key to an access control device, such as a transit gate. Each of the QR codes, or at least those containing access information, may be encrypted using the key stored on a memory of the mobile device 100. For example, the mobile application running on the mobile device 100 may retrieve the key stored in the memory and use the retrieved key to encrypt the set of QR codes 106a-106d. When the set of QR codes 106a-106d are presented to the access control device, the access control device may decrypt the QR codes using the other key that is stored on the access control device.

In some embodiments, additional encryption steps may be used. For example, a beacon or other wireless source may include one key of a second key pair, with the other key being stored at the access control point. When in range of the signal of the beacon, the mobile device 100 may receive the one key from the beacon. The mobile device 100 may then further encrypt the QR codes using the second key. The access point may then also use the second key to decrypt the QR codes. In some embodiments, only the key from the beacon is used to encrypt the QR codes, without the first key that is provided by the transit system.

In order to further ensure that there is a very limited window of time the QR codes are usable, the QR codes may each be encrypted using the current time and date. In order to gain access, the QR code must be scanned by an access control device within a certain amount of time from their generation, as the access control device may use its own record of the current date and time to decrypt the QR codes. For example, the mobile application of the mobile device 100 may encrypt the QR codes using a code that represents a small timeframe, such as 3-5 minutes, although other time ranges may be used. For example, if a mobile device 100 is used to generate a set of QR codes at 1:31 pm, the mobile device 100 may encrypt the QR codes with using a key or other code that represents a time period of 1:31-1:36 pm. This provides the user of the mobile device 100 a small 5 minute window within which to get the QR codes scanned.

Based on when the QR codes are scanned by the access control device, the access control device may attempt to decrypt the QR codes by using the current time and/or a code associated with a short time period, such as within 5 minutes of the current time. For example, if a user attempts to scan a set of QR codes at 1:35 pm, the access control device may attempt to decrypt the QR codes using times between about 1:32 and 1:38 pm of that particular date. It will be appreciated that the range of times for decryption may be smaller or larger in a particular application. Not only do ranges of times provide time for a user to have the QR codes scanned after initiating their generation, but also provides some leeway in instances where the internal clocks of the mobile device 100 and the access control device are slightly different from one another. An alternative solution to the problem of device time discrepancies is to have the mobile application use a clock provided by an operator of the access controlled device. For example, the mobile application may be provided with a clock that is configured to synchronize with a clock on an operator's server, which may control the clocks of all access control devices. By using the mobile application's internal clock, rather than a clock of the mobile device, the clocks used to generate and read the QR codes may be in sync with one another.

In some embodiments, rather than using a current tine, the QR codes may be encoded using a customized time or other unique code determined by an operator of the controlled access area. For example, the operator of the controlled access area may utilize a different timekeeping system, such as by offsetting the operator time from the conventional time. The customized time system may be provided by the operator to the mobile device 100, such as by supplying the customized time system to a mobile application that is downloaded on the mobile device 100. This makes it harder for a fraudulent user to circumvent the encoding process, as they would have to have access to the offset or otherwise different time system used by the operator. In other embodiments, the operator may have a set of encryption keys or other codes for each small increment of time in a day. For example, each small interval of time, such as 3-5 minutes, may have a corresponding encryption key. When a mobile device 100 is used to generate QR codes, an encryption key associated with the current time may be selected an used to encrypt the QR codes. A current date may be added onto the time of day encryption key to limit the use of an encrypted QR code to the specific time interval within a particular day. There may be some overlap between each interval, thus preventing the scenario where a user may generate a set of QR codes at the end of a 3 minute interval still has time to have the QR codes scanned by an access control device. For example, two time intervals may be from 1:50-1:53 pm and from 1:52-1:55 pm. If a user attempts to generate a set of QR codes late in an interval, such as at 1:52 pm, the encryption will be done using the key associated with the second time interval (1:52-1:55 pm) to ensure that the user has a sufficient time (although still relatively short to prevent fraud) to get the QR codes scanned after generating the set.

In some embodiments, along with the set of QR codes, an expiration time and/or countdown to expiration may be displayed on the screen 102 of the mobile device 100. This helps a user determine how long they have to get the set of QR codes scanned. In some cases, upon expiration of this time, the mobile device 100 will automatically refresh the set of QR codes such that a new set of QR codes that are encrypted with a more recent time and date are displayed. In other embodiments, upon expiration of the QR codes, the mobile device 100 may prompt the user to initiate a refresh process to generate a new set of QR codes.

In some embodiments, the generation of QR codes by the mobile device 100 may require that the mobile device 100 and/or mobile application detect that the user is near an access control point. For example, the mobile device 100 may detect a wireless signal from a beacon positioned on or proximate to an access control device. This beacon signal may alert the mobile device 100 that it is near the access control device and enable the initiation of the QR code generation process. In some embodiments, the beacon may also send an additional key for encryption of the barcodes as described above. In other embodiments, the camera 104 or other imaging device of the mobile device 100 may be used to detect that user is near the access control point. For example, the user may need to use the camera 104 to capture an image of a portion of the access control device and/or other device in order to start the QR code generation process. As just one example, a barcode, QR code, and/or other machine readable identifier may be posted on or near the access control point may include information that, when read by the camera 104, identifies the access control device and unlocks and/or automatically initiates the QR code generation process.

Figure 2:
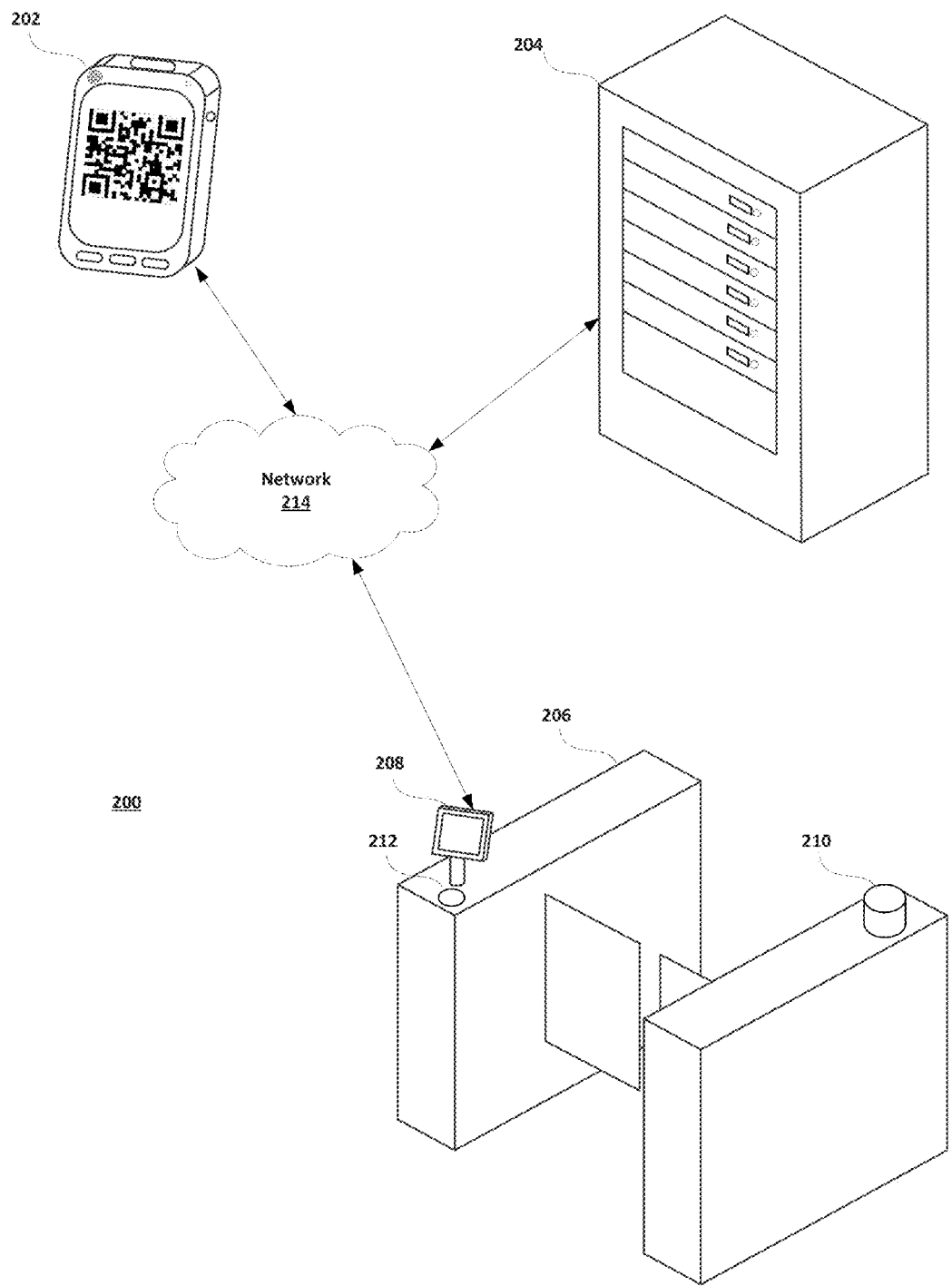
FIG. 2 depicts a system for managing access to a controlled area according to embodiments.

FIG. 2 depicts a system 200 for managing access to a secured area. System 200 may include at least one mobile device 202. Mobile device 202 may be similar to mobile device 100 and may be configured to be used as an entry media to gain access to controlled areas. For example, the mobile device 202 may be configured to generate a set of computer readable identifiers, such as barcodes, QR codes, and the like. The identifiers may be displayed sequentially on a screen of the mobile device 202. The set of identifiers includes at least one identifier that includes access information, such as access authorization credentials, an access ticket, identity information, and/or any other information an operator of the access controlled area deems necessary for entry into the controlled access area. These identifiers may be encrypted using one or more keys from an operator of the secured or access controlled area. For example, a back office or server 204 may provide the mobile device 202 with one or more keys that may be used to encrypt the identifiers. In some embodiments, the server 204 may provide the mobile device 202 with a mobile application that is configured to store the key and to generate the identifiers. In addition to this key, the mobile device 202 may further encrypt the identifiers using the current time and date.

System 200 may also include an access control device 206 that includes an optical imager 208, such as a barcode reader. Access control device 206 may be a turnstile, mobile device, gate, door, door lock mechanism, and/or any other device having an optical imager 208 that may be used to prevent unauthorized access to a controlled area. In some embodiments, the access control device 206 may be a hand operated mobile device, such as a ticket scanning device. The optical imager 208 may read and decrypt the identifiers displayed on the mobile device 202. To decrypt the identifiers, the access control device 206 may receive a key from the server 204 that corresponds to the key stored on the mobile device 202. The access control device 206 may also use a current time and date of the time of scanning the identifiers to decrypt the identifiers.

In some embodiments, the access control device 204 may include a beacon 210. The beacon 210 may broadcast a wireless signal, such as using WiFi, Bluetooth Low Energy, and/or other short range wireless signal. In some embodiments, beacon 210 may be configured to communicate with the user's mobile device 202. For example, the beacon 210 may detect and send a wakeup signal to the mobile device 202 that opens the mobile application to initiate the process of generating the set of identifiers. In other embodiments, rather than automatically initiating the generation of the identifiers, the beacon's signal may unlock the mobile application, allowing a user of the mobile device 202 to interact with the mobile device 202 to initiate the process.

The beacon 210 may be further configured to provide an additional key to the mobile device 202. The additional key may be one that is not permanently stored on the mobile device 202, but instead is only temporarily stored and used for immediate encryption of the set of identifiers when the mobile device 202 is within a range of the beacon's signal. Such a key may ensure that the identifiers cannot be generated too early relative to when they are to be scanned, thus minimizing the amount of time in which a fraudulent user may copy the identifiers. A corresponding key may be stored at the access control device 206 such that the access control device 206 may decrypt the identifiers.

It will be appreciated that beacon 210 may be positioned at a location other than on the access control device 206. For example, the beacon 210 may be positioned on a post, wall, near a door, and/or at another location near an access control device 206. This may be particularly useful in situations where the access control device 206 is a mobile device. For example, at a sporting event a number of mobile access control devices 202 may be used by ticket attendants. The beacon 210 may be positioned on a structure a short distance outside of the stadium such that the beacon 210 may communicate with a user's mobile device 202 prior to the user reaching the ticket attendants. This enables the user's mobile device 202 to initiate an identifier generation process prior to reaching the attendants and access control devices 206.

In some embodiments, access control device 206 may include an identifier tag 212. This tag 212 may include information that alerts the mobile device 202 that the mobile device 202 is near the access control device 206. For example, the identifier tag 212 may include a barcode, QR code, and/or other computer readable identifier. A camera or other optical imaging device of the mobile device 202 may be used to read the identifier tag 212, which may unlock and/or initiate the identifier generation process on the mobile device. In some embodiments, the identifier tag 212 may include an NFC and/or other RFID tag, which when read by a reader of the mobile device 202, may provide similar information as an optical identifier. In some embodiments, the identifier tag 212 may include both visual and/or wireless data. In addition to alerting the mobile device 202 that it is positioned proximate the access control device 206, the identifier tag 212 may also include one key of a shared key pair that may be read by the mobile device 202 and used to encrypt the generated identifiers. The other key of the pair may be known to the access control device 206 such that the access control device 206 may decrypt any identifiers read from mobile devices 202.

Similar to the beacon 210, it will be appreciated that the identifier tag 212 may be positioned at a location other than on the access control device 206. For example, the identifier tag may be positioned on a post, wall, near a door, and/or at another location near an access control device 206. This may be particularly useful in situations where the access control device 206 is a mobile device. For example, at a sporting event a number of mobile access control devices 202 may be used by ticket attendants. The identifier tag 212 may be positioned on a structure a short distance outside of the stadium such that the identifier tag 212 may be read by a user's mobile device 202 prior to the user reaching the ticket attendants. This enables the user's mobile device 202 to initiate an identifier generation process prior to reaching the attendants and access control devices 206.

In some embodiments, upon scanning the set of identifiers from the mobile device 202, the access control device 206 may determine whether the user of the mobile device 202 is authorized to access the secured area. This may involve determining whether the identifier set included valid access information, such as a valid ticket, valid authentication information, valid funds, a valid travel pass, and/or other information an operator of the controlled area deems necessary for allowing access. Upon determining that the user is authorized to access the controlled area, the access control device 206 may grant physical access to the user. For example, the access control device 206 may physically manipulate one or more access mechanisms of the access control device to allow physical access of the user. As just one example, a gate or turnstile may be physically opened, raised, and/or unlocked to enable passage of the user. As another example, the access control device 206 may send a signal to a light source, display, and/or audio source of the access control device 206 such that a sound and/or visual signal is produced that alerts the user and/or an access control employee that the user should be permitted access.

Once access is granted, the access control device 206 may update a status of the access information. This may include recording a time, date, name, ticket number, and/or other information associated with access to eh controlled area. For example, if the access control device 206 is one of many ticket devices that read unique ticket information from the mobile devices 202, the access control device 206 may update a list of redeemed tickets to indicate that the particular ticket read from mobile device 202 was redeemed. This update may be communicated to other access control devices 206 and/or the server 204. If updated in real-time or near real-time, such updating ensures that the ticket may only be redeemed a single time. In other embodiments, such as those utilizing stored value media, access information may be updated such that the stored value associated with an account accessed using the mobile device 202 may be updated. In other situations, information about the user of the mobile device 202 may be provided to server 202, oftentimes along with a time and/or date of entry. This may be useful for tracking the usage of a particular unlimited access pass, both for determining whether a user took full advantage of the unlimited pass and/or to monitor which individuals had access to a particular controlled area at a particular time. Such information may be particularly useful for security purposes. In some embodiments, the same access control ticket could be used again and again by an authorized holder, such as when the ticket is a reusable annual season ticket. For each subsequent use of the ticket, the QR codes may be re-generated afresh as a new looping video of QR codes that contain the same encrypted data. The only change would be from the initial use of the ticket would be that the ticket is encrypted with the new current date and time.

Each of the devices in system 200 may be communicatively coupled using one or more local area networks (LAN) 214 and/or other wired and/or wireless networks 214. Network 214 may utilize one or more of Wi-Fi, ZigBee, Bluetooth™, Bluetooth™ Low Energy, a cellular communications protocol such as 3G, 4G, or LTE, and/or any other wireless communications protocol. It will be appreciated that one or more different network connections may be used in accordance with the invention, and that the use of a single network 214 to enable communications is merely one example of such configurations. For example, each component may be communicatively coupled with other components using a separate network for one or more of the connections. The connections between the mobile devices 202, server 204, and the access control devices 206 may be secure. This may be done using encryption over a public network, a private network, a secure virtual private network (VPN), or any other method of securing a connection.

Figure 3:
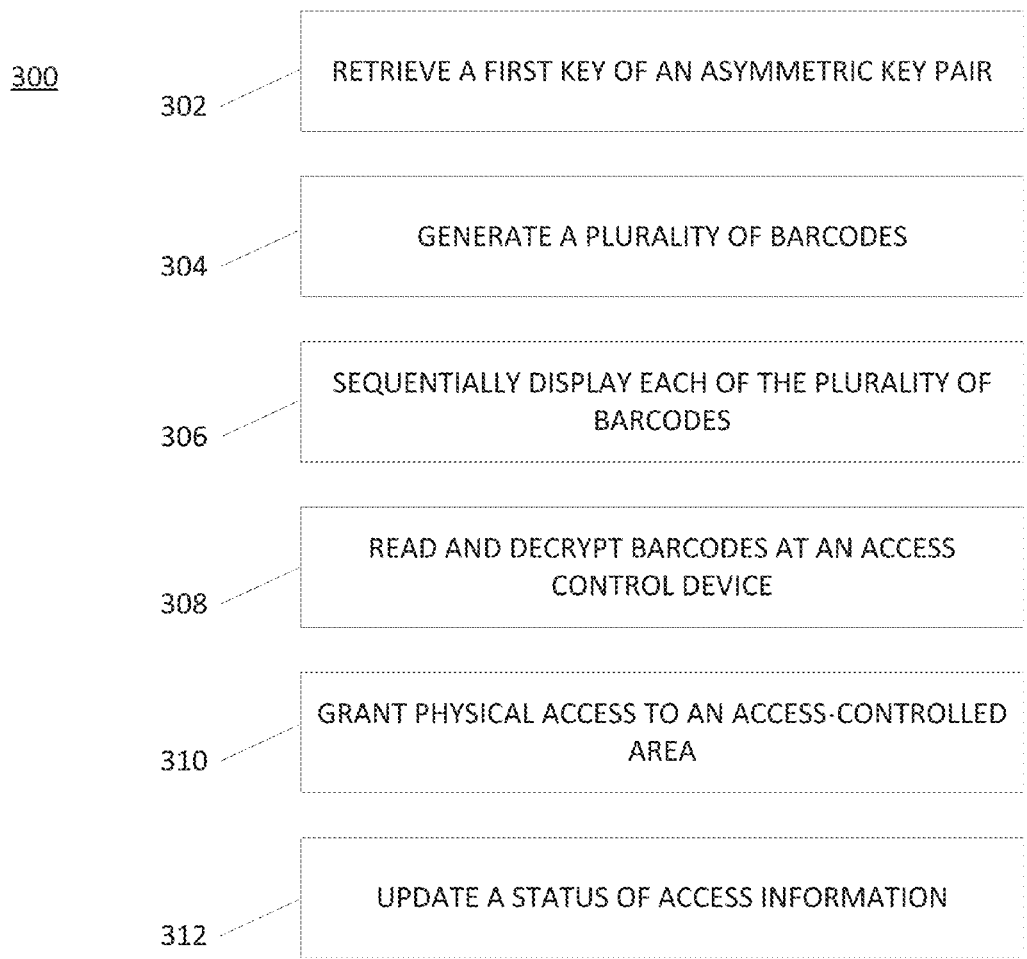
FIG. 3 is a flowchart depicting a process for managing access to a controlled area according to embodiments.

FIG. 3 is a flowchart depicting a process 300 for managing access to a controlled area using a mobile device. Process 300 may be performed using a mobile device, such as mobile device 100 or mobile device 200 as described herein. In some embodiments, the operation of some or all of the process 300 may be controlled by a mobile application running on the mobile device. Process 300 may begin at block 302 by the mobile device retrieving a first key of an asymmetric key pair. This first key may be provided by an operator of the access controlled area and may be used to encrypt information provided by the mobile device. In some embodiments, this key may be provided to the mobile device by the operator using the mobile application. For example, when the mobile device downloads and initializes the mobile application, the first key may be stored on a memory of the mobile device. In other embodiments, the first key may be provided to the mobile device via a wireless beacon positioned on or near an access control device. The beacon may transmit a signal to the mobile device that includes a key that may be used for encryption of data. In other embodiments, the key may come from an identifier tag positioned on or near an access control device. The identifier tag may provide a key when read by the mobile device using a camera, NFC reader, RFID reader, and/or other input device of the mobile device. For example, a user may activate an imaging device of the mobile device and detect a barcode reader positioned near an access point (such as by scanning the identifier tag, which may indicate that a barcode reader/access control device is nearby).

A second key of the asymmetric key pair is stored on an access control device for use in decrypting any data received from the mobile device. In some embodiments, combinations of the keys may be used by the mobile device to encrypt data. As just one example, a key may be provided both with the mobile application and received from a beacon. One or both of these keys may be used by the mobile device to encrypt data.

After retrieving at least one key, the mobile device may generate a plurality of barcodes or other computer readable identifiers, such as QR codes and the like, at block 304. Each of the barcodes may include data that is encrypted using the first key and a current date and time. In some embodiments, the current date and time may include a time value that is offset from conventional time values by a predetermined amount as determined by an operator of the access controlled area. This offset may be kept confidential, making it harder for a fraudulent user to mimic the encryption process in duplicating barcodes. At least some of the barcodes are distinct from one another, which makes it much more difficult for a user to fraudulently copy and misappropriate. At least one of the barcodes includes access information such as a unique identifier of a user and/or of the mobile device, ticket information, such as a ticket identifier, a seat location, a time and/or date of an event, a security code, and/or other information needed to access a particular access controlled area. Each operator of a controlled access area may determine what information is needed for access, and this information may be encoded on one or more of the barcodes.

In some embodiments, the generation of barcodes may be triggered automatically, such as when an access control device is detected within a proximity of the mobile device. For example, the mobile application may detect a signal from the beacon, which may trigger the generation of barcodes and/or unlock such a process. In other embodiments, reading the identifier tag may cause the mobile application to determine that a barcode reader of an access control device is nearby and automatically initiate the barcode generation process and/or unlock such a process. In other embodiments, the user of the mobile device may interact with the mobile device to initiate the generation process.

At block 306, the mobile device may sequentially display the barcodes such that only a single one of the plurality of barcodes is displayed on a screen of the mobile device at a single time. Oftentimes, the barcodes may be displayed as a looping video, with one barcode being displayed after another until the each barcode within the set has been displayed. The barcodes may be displayed at a specific framerate. For example, for use with standard barcode readers, the framerate may be slow such that each barcode is displayed for a second or two, allowing sufficient time for the standard equipment to read each barcode. In other embodiments, such as those using customized barcode readers, the framerate may be sped up such that the set of barcodes may be read very quickly, increasing the difficulty to copy the barcodes. In some embodiments, the framerate may be varied among the set of barcodes, further complicating the process to make duplicating barcodes more difficult. Oftentimes, the barcodes are usable only for a predetermined length of time from a time of generation. For example, the barcodes may expire after a short period of time, such as about 2-3 minutes. After this time, new barcodes may be generated, either automatically or when triggered by a user interaction.

The displayed barcodes may read and decrypted by the access control device using the second key (and/or a respective pair of any additional key sets) and the current date and time at block 308. For example, the access control device may attempt to decrypt the barcodes by using the current time. To provide for a small wait time between generation and redemption of the barcodes, such as do to queue times, different clock settings between the mobile device and the access control device, and the like, the access control device may attempt to decrypt the barcodes using a small range of times based on the current time. For example, a small 3-5 minute window of times may be used to decrypt the barcodes. It will be appreciated that the range of times for decryption may be smaller or larger in a particular application.

In some embodiments, upon scanning the set of identifiers from the mobile device, the access control device may determine whether the user of the mobile device 202 is authorized to access the secured area. This may involve determining whether the identifier set included valid access information, such as a valid ticket, valid authentication information, valid funds, a valid travel pass, and/or other information an operator of the controlled area deems necessary for allowing access. Upon determining that the user is authorized to access the controlled area, the access control device may grant physical access to the user at block 310. For example, the access control device may physically manipulate one or more access mechanisms of the access control device to allow physical access of the user.

Once access is granted, the access control device may update a status of the access information at block 312. This may include recording a time, date, name, ticket number, and/or other information associated with access to eh controlled area. For example, a list of redeemed tickets may be updated to indicate that the particular ticket read from mobile device was redeemed. This update may be communicated to other access control devices and/or the server. In other embodiments, stored value information associated with an account accessed using the mobile device may be updated. In other situations, information about the user of the mobile device along with a time and/or date of entry may be recorded.

Figure 4:
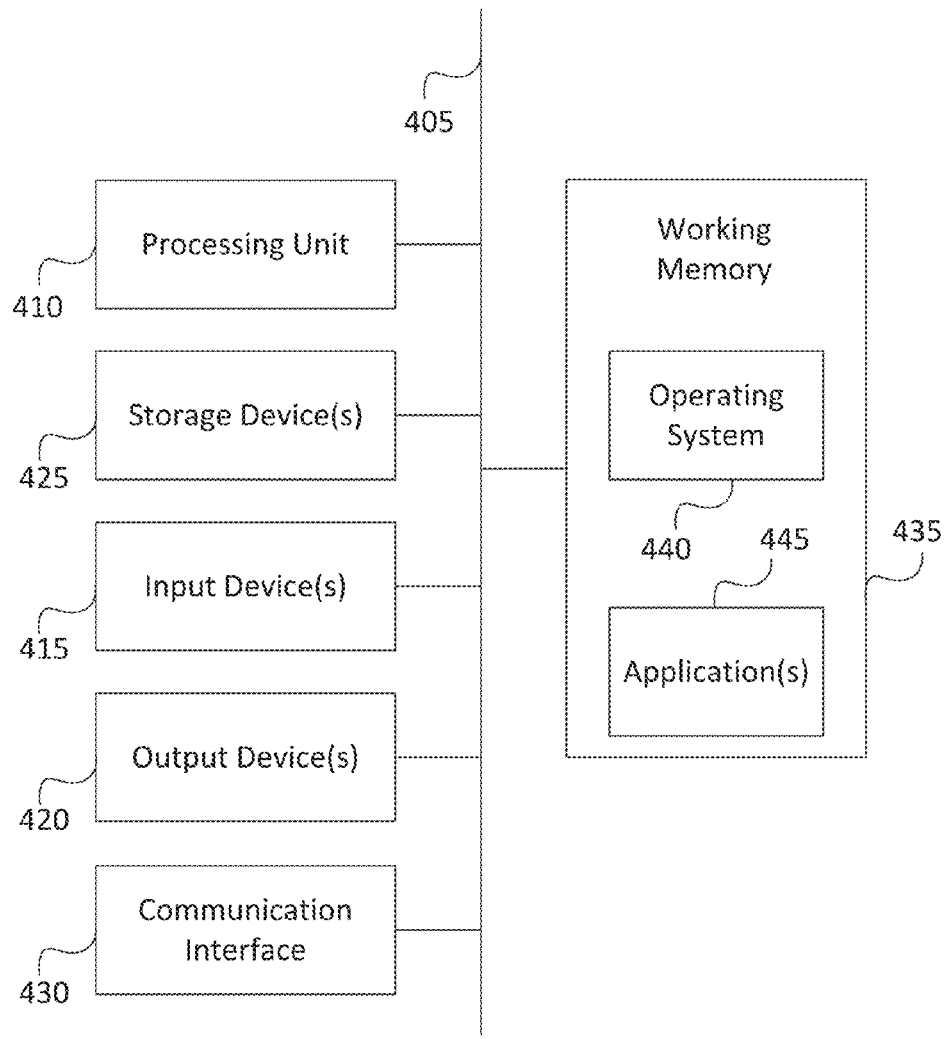
FIG. 4 is a block diagram of an example computing system according to embodiments.

A computer system as illustrated in FIG. 4 may be incorporated as part of the previously described computerized devices. For example, computer system 400 can represent some of the components of the retail devices, servers, and/or mobile devices described herein. FIG. 4 provides a schematic illustration of one embodiment of a computer system 400 that can perform the methods provided by various other embodiments, as described herein. FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include a processing unit 410, including without limitation one or more processors, such as one or more special-purpose processors (such as digital signal processing chips, graphics acceleration processors, and/or the like); one or more input devices 415, which can include without limitation a keyboard, a touchscreen, receiver, a motion sensor, a camera, a smartcard reader, a contactless media reader, and/or the like; and one or more output devices 420, which can include without limitation a display device, a speaker, a printer, a writing module, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communication interface 430, which can include without limitation a modem, a network card (wireless or wired), an infrared communication device, a wireless communication device and/or chipset (such as a Bluetooth™ device, an 502.11 device, a Wi-Fi device, a WiMax device, an NFC device, cellular communication facilities, etc.), and/or similar communication interfaces. The communication interface 430 may permit data to be exchanged with a network (such as the network described below, to name one example), other computer systems, and/or any other devices described herein. In many embodiments, the computer system 400 will further comprise a non-transitory working memory 435, which can include a RAM or ROM device, as described above.

The computer system 400 also can comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such special/specific purpose code and/or instructions can be used to configure and/or adapt a computing device to a special purpose computer that is configured to perform one or more operations in accordance with the described methods.

A set of these instructions and/or code might be stored on a computer-readable storage medium, such as the storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure and/or adapt a special purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, a risk management engine configured to provide some or all of the features described herein relating to the risk profiling and/or distribution can comprise hardware and/or software that is specialized (e.g., an application-specific integrated circuit (ASIC), a software method, etc.) or generic (e.g., processing unit 410, applications 445, etc.) Further, connection to other computing devices such as network input/output devices may be employed.

Some embodiments may employ a computer system (such as the computer system 400) to perform methods in accordance with the disclosure. For example, some or all of the procedures of the described methods may be performed by the computer system 400 in response to processing unit 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the storage device(s) 425. Merely by way of example, execution of the sequences of instructions contained in the working memory 435 might cause the processing unit 410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 400, various computer-readable media might be involved in providing instructions/code to processing unit 410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 425. Volatile media include, without limitation, dynamic memory, such as the working memory 435. Transmission media include, without limitation, coaxial cables, copper wire and fiber optics, including the wires that comprise the bus 405, as well as the various components of the communication interface 430 (and/or the media by which the communication interface 430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a non-transitory storage device 425 either before or after execution by the processing unit 410.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

What is claimed is:

1. A mobile device, comprising:
   a communications interface;
   a memory;
   a display screen; and
   a processing unit configured to:
   retrieve a first key of an asymmetric key pair, wherein a second key of the asymmetric key pair is stored on an access control device;

generate a plurality of barcodes, wherein:
each of the plurality of barcodes comprises data that is encrypted using the first key and a current date and time;
at least some of the plurality of barcodes are distinct from one another;
only a subset of the plurality of barcodes comprises access information such that only data from the subset is needed for the access control point to grant access to a user of the mobile device, wherein the access information comprises any data needed for passage through the access control device; and
sequentially display the plurality of barcodes such that only a single one of the plurality of barcodes is displayed on the display screen of the mobile device at a single time, wherein the plurality of barcodes are read and decrypted by the access control device using the second key and the current date and time.

2. The mobile device of claim 1, wherein:
retrieving the first key comprises accessing a portion of the memory associated with a mobile ticketing application to locate the first key.

3. The mobile device of claim 1, wherein:
the plurality of barcodes are displayed as a looping video with each of the plurality of barcodes being displayed for a predetermined amount of time.

4. The mobile device of claim 3, wherein:
the predetermined amount of time is different for at least some of the plurality of barcodes.

5. The mobile device of claim 1, wherein the processing unit is further configured to:
detect that the mobile device is in proximity to an access point; and
trigger the generation of the plurality of barcodes based on the detection.

6. The mobile device of claim 1, wherein:
the plurality of barcodes are usable only for a predetermined length of time from a time of generation.

7. The mobile device of claim 1, wherein:
the access information comprises product information associated with a specific user of the mobile device.

8. A method for managing access to a controlled area using a mobile device, the method comprising:
retrieving, by a mobile device, a first key of an asymmetric key pair, wherein a second key of the asymmetric key pair is stored on an access control device;
generating, by the mobile device, a plurality of barcodes, wherein:
each of the plurality of barcodes comprises data that is encrypted using the first key and a current date and time;
at least some of the plurality of barcodes are distinct from one another;
only a subset of the plurality of barcodes comprises access information such that only data from the subset is needed for the access control point to grant access to a user of the mobile device, wherein the access information comprises any data needed for passage through the access control device; and
sequentially displaying the plurality of barcodes such that only a single one of the plurality of barcodes is displayed on a screen of the mobile device at a single time, wherein the plurality of barcodes are read and decrypted by the access control device using the second key and the current date and time.

9. The method for managing access to a controlled area using a mobile device of claim 8, wherein:
each of the plurality of barcodes comprises a quick response (QR) code.

10. The method for managing access to a controlled area using a mobile device of claim 8, wherein:
the plurality of barcodes are displayed as a looping video.

11. The method for managing access to a controlled area using a mobile device of claim 8, wherein:
the plurality of barcodes are displayed at a specified framerate.

12. The method for managing access to a controlled area using a mobile device of claim 8, wherein:
the current date and time comprise a time value that is offset from conventional time values by a predetermined amount.

13. The method for managing access to a controlled area using a mobile device of claim 8, further comprising:
detecting a signal from a wireless beacon positioned proximate an access point;
receiving a third key of an additional asymmetric key pair from the wireless beacon; and
triggering the generation of the plurality of barcodes based on the detection of the signal, wherein the plurality of barcodes are further encoded using the third key.

14. The method for managing access to a controlled area using a mobile device of claim 8, further comprising:
activating an imaging device of the mobile device;
detecting, using the imaging device, a barcode reader positioned near an access point; and
triggering the generation of the plurality of barcodes based on the detection of the barcode reader.

15. A non-transitory computer-readable medium having instructions embedded thereon for managing access to a controlled area using a mobile device, the instructions comprising computer code for causing a computing device to:
retrieve a first key of an asymmetric key pair, wherein a second key of the asymmetric key pair is stored on an access control device;
generate a plurality of barcodes, wherein:
each of the plurality of barcodes comprises data that is encrypted using the first key and a current date and time;
at least some of the plurality of barcodes are distinct from one another;
only a subset of the plurality of barcodes comprises access information such that only data from the subset is needed for the access control point to grant access to a user of the mobile device, wherein the access information comprises any data needed for passage through the access control device; and
sequentially display the plurality of barcodes such that only a single one of the plurality of barcodes is displayed on a display screen of the mobile device at a single time, wherein the plurality of barcodes are read and decrypted by the access control device using the second key and the current date and time.

16. The non-transitory computer-readable medium of claim 15, wherein:
the plurality of barcodes are usable only for a predetermined length of time from a time of generation.

17. The non-transitory computer-readable medium of claim 15, wherein:
each of the plurality of barcodes comprises a quick response (QR) code.

18. The non-transitory computer-readable medium of claim 15, wherein:
the plurality of barcodes are displayed as a looping video with each of the plurality of barcodes being displayed for a predetermined amount of time.

19. The non-transitory computer-readable medium of claim 15, wherein the instructions further comprise computer code for causing the computer device to:
detect a signal from a wireless beacon positioned proximate an access point;
receive a third key of an additional asymmetric key pair from the wireless beacon; and
trigger the generation of the plurality of barcodes based on the detection of the signal, wherein the plurality of barcodes are further encoded using the third key.

20. The non-transitory computer-readable medium of claim 15, wherein the instructions further comprise computer code for causing the computer device to:
activate an imaging device of the mobile device;
detect, using the imaging device, a barcode reader positioned near an access point; and
trigger the generation of the plurality of barcodes based on the detection of the barcode reader.

\* \* \* \* \*